(12) United States Patent
de Forest et al.

(10) Patent No.: US 8,751,740 B1
(45) Date of Patent: Jun. 10, 2014

(54) SYSTEMS, METHODS, AND COMPUTER READABLE MEDIA FOR PERFORMANCE OPTIMIZATION OF STORAGE ALLOCATION TO VIRTUAL LOGICAL UNITS

(75) Inventors: Miles de Forest, Bahama, NC (US); Chetan Rameshchandra Vaidya, Morrisville, NC (US); David Haase, Fuquay Varina, NC (US); Paul T. McGrath, Raleigh, NC (US); Robert F. Goudreau, Jr., Cary, NC (US); Charles Christopher Bailey, Cary, NC (US); Prabu Surendra, Vellore (IN)

(73) Assignee: EMC Corporation, Hopkinton, MA (US)

( * ) Notice: Subject to any disclaimer, the term of this patent is extended or adjusted under 35 U.S.C. 154(b) by 179 days.

(21) Appl. No.: 12/751,707

(22) Filed: Mar. 31, 2010

(51) Int. Cl.
*G06F 13/00* (2006.01)
(52) U.S. Cl.
USPC .................... 711/114; 711/170; 711/E12.005
(58) Field of Classification Search
None
See application file for complete search history.

(56) References Cited

U.S. PATENT DOCUMENTS

| 8,037,345 | B1 * | 10/2011 | Iyer et al. | 714/6.12 |
|---|---|---|---|---|
| 8,479,046 | B1 * | 7/2013 | Bailey et al. | 714/25 |
| 2003/0145167 | A1 | 7/2003 | Tomita | 711/114 |
| 2003/0208703 | A1 | 11/2003 | Goodman et al. | |
| 2004/0049564 | A1 | 3/2004 | Ng et al. | |
| 2008/0250272 | A1 | 10/2008 | Barnes | |
| 2009/0030956 | A1 * | 1/2009 | Zhang et al. | 707/205 |
| 2009/0327840 | A1 * | 12/2009 | Moshayedi | 714/773 |
| 2010/0106907 | A1 | 4/2010 | Noguchi et al. | |
| 2011/0231594 | A1 * | 9/2011 | Sugimoto et al. | 711/103 |
| 2013/0232503 | A1 * | 9/2013 | Volvovski et al. | 718/104 |

OTHER PUBLICATIONS

Commonly-assigned, co-pending U.S. Appl. No. 12/824,966 for "Systems, Methods, and Computer Readable Media for Tracking Pool Storage Space Reservations," (Unpublished, filed Jun. 28, 2010).
Non-Final Official Action for U.S. Appl. No. 12/824,966 (Apr. 11, 2012).
Notice of Allowance and Fee(s) Due for U.S. Appl. No. 12/824,966 (Mar. 4, 2013).
Applicant-Initiated Interview Summary for U.S. Appl. No. 12/824,966 (Jan. 11, 2013).
Non-Final Official Action for U.S. Appl. No. 12/824,966 (Sep. 11, 2012).
Applicant-Initiated Interview Summary for U.S. Appl. No. 12/824,966 (Jul. 11, 2012).

* cited by examiner

*Primary Examiner* — Sean D Rossiter
(74) *Attorney, Agent, or Firm* — Jenkins, Wilson, Taylor & Hunt, P.A.

(57) ABSTRACT

A system for performance optimization of storage allocation to virtual logical units includes a storage entity having data storage space divided into slices for storing data. A slice allocation table stores slice allocation status. A memory stores statistics regarding the allocation of slices to logical units. A management database stores information regarding the allocation of slices to logical units. An allocation module performs an allocation process in response to receiving an I/O write request. A management module performs scheduled post-I/O management processes asynchronously with allocation processes, including updating the management database to reflect the allocation of the selected slice, and updating the status of the selected slice in the slice allocation table to indicate that the post-I/O management process for the selected slice has been performed.

10 Claims, 4 Drawing Sheets

SLICE ALLOCATION TABLE

| SLICE | STATUS | ALLOCATED TO |
|---|---|---|
| 1 | ALLOCATED-COMMITTED | LUN0 |
| 2 | ALLOCATED-COMMITTED | LUN0 |
| 3 | ALLOCATED-COMMITTED | LUN1 |
| 4 | ALLOCATED-UNCOMMITTED | LUN0 |
| 5 | ALLOCATED-COMMITTED | LUN1 |
| 6 | ALLOCATED-UNCOMMITTED | LUN1 |
| 7 | UNALLOCATED | -- |
| : | UNALLOCATED | -- |

FIG. 5

IN-MEMORY STATISTICS / MANAGEMENT DATABASE

| STORAGE DEVICE | TOTAL # SLICES | # SLICES ALLOCATED |
|---|---|---|
| 1 | 64 | 40 |
| 2 | 64 | 12 |
| 3 | 64 | 63 |
| : | -- | -- |

FIG. 6

SYSTEMS, METHODS, AND COMPUTER READABLE MEDIA FOR PERFORMANCE OPTIMIZATION OF STORAGE ALLOCATION TO VIRTUAL LOGICAL UNITS

TECHNICAL FIELD

The subject matter described herein relates to methods and systems for data storage, backup, and recovery. More particularly, the subject matter described herein relates to systems, methods, and computer readable media for performance optimization of storage allocation to virtual logical units.

BACKGROUND

Data storage systems, such as disk storage arrays, are called upon to store and manage increasingly larger amounts of data, e.g., in gigabytes, terabytes, petabytes, and beyond. As a result, it is increasingly common or necessary that this large amount of data be distributed across multiple hard disk drives or other storage entities. Some conventional systems treat the collection of storage devices as a unified pool of data storage space that is divided into equal sized portions, where a portion may be as small as a single sector on a hard disk (e.g., 512 bytes) or as large as an entire hard disk drive, or even multiple hard disk drives.

One or more portions may be organized into collections called logical units. This process is referred to as allocating a portion to a logical unit. Once a portion has been allocated to a logical unit, that portion is exclusively used by the logical unit. Portions that have not been organized into or associated with a logical unit are referred to as unallocated portions. A logical unit can be a subset of a single storage device, e.g., a hard disk drive may contain multiple logical units; a logical unit can be an entire storage device; and a logical unit can span multiple storage devices, e.g., a logical unit may be distributed across multiple storage devices organized into a redundant array of inexpensive disks (RAID) array.

A requesting entity, such as an application, program, operating system, and the like, may request that a certain amount of data storage space be allocated for the requesting entity's use, e.g., into which the requesting entity will store data. The process of requesting and receiving storage space is hereinafter generically referred to as "storage allocation". When an entity makes a storage allocation request, the data storage system may have multiple portions available for allocation to the requesting entity. In this situation, the data storage system may perform a selection process to select the portion to be allocated. This selection process may include reading allocation information, maintained by the disk storage device or the data storage system, that indicates which portions of the memory are allocated, and to whom. The selection process identifies a portion of memory to be allocated to the requesting entity, and the allocation information must be updated to reflect this allocation. Allocation information is typically stored in non-volatile storage, such as in a database. Thus, a conventional allocation process includes accessing a database in order to read and later write or update allocation information, which is expensive in terms of time and resources.

For storage systems that perform storage allocation in advance, the time taken to read and write the allocation information is not critical. However, some storage systems do not allocate storage until the storage is actually needed. In these storage systems, a storage allocation request may be issued in response to an I/O write request, i.e., a request to store data to a storage device. In this scenario, the data storage system may receive an I/O write to a logical unit, determine that the logical unit does not have enough space to store the data to be written, and make a storage allocation request for more storage space. In response to a storage allocation request that was triggered by an I/O write, the storage system must select a portion to be allocated, allocate the selected portion, write the data into the allocated portion, and commit the transaction, i.e., update the allocation information within the database to reflect the fact that a previously unallocated portion of data storage has been allocated and that the I/O write was successful (or unsuccessful.)

In conventional storage systems, the next I/O operation cannot be processed until the previous I/O operation has been committed. There are disadvantages associated with the conventional approach just described. One disadvantage is that, when a storage allocation is triggered by an I/O write, the allocation information is accessed twice: once during the selection process and again during the allocation process. Because accessing the database to read or write the allocation information is expensive in terms of time, this limits the number of I/O writes that may be processed per unit of time, since the next I/O write cannot be processed until the allocation information has been updated from the previous I/O write. The I/O latency is also increased due to the fact that the database transaction must be completed before completing the I/O operation.

These disadvantages are exacerbated for storage systems that do not allocate space in advance, but instead allocate space as needed, i.e., at the time that the I/O write is received. In such systems the time required to access and update the allocation information can significantly reduce the performance of the overall system, because an I/O operation that triggers an allocation can put subsequent I/O operations on hold until the allocation process completes.

Accordingly, in light of these disadvantages associated with the conventional approach, there exists a need for systems, methods, and computer readable media for performance optimization of storage allocation to virtual logical units.

SUMMARY

According to one aspect, the subject matter described herein includes a system for performance optimization of storage allocation to virtual logical units. The system includes a storage entity having data storage space for storing data, the data storage space being divided into a plurality of slices, and a slice allocation table for storing slice allocation status. The system includes a memory, different from the data storage space, used for storing statistics regarding the allocation of slices to logical units. The system includes a management database, different from the memory and the slice allocation table, for storing information regarding the allocation of slices to logical units. The system also includes an allocation module for performing an allocation process in response to receiving an I/O write request, where the allocation process includes selecting, from the plurality of slices, a slice to be allocated based on in-memory statistics, allocating the selected slice, updating the in-memory statistics to reflect the allocation of the selected slice, processing the I/O write request, scheduling a post-I/O management process to be performed asynchronously, and updating the slice allocation table to indicate that the post-I/O management process for the selected slice is pending. The system also includes a management module for performing scheduled post-I/O management processes asynchronously with allocation processes, where the post-I/O management process for the selected slice includes updating the management database to reflect the allocation of the selected slice, and updating the status of the selected slice in the slice allocation table to indicate that the post-I/O management process for the selected slice has been performed. In one embodiment, in response to an event that causes the in-memory statistics to be unreliable, the allocation module is configured to access the slice allocation table to identify slices whose status indicates that the post-I/O management operation for that slice is pending and to schedule a post-I/O management operation for each slice so identified.

According to another aspect, the subject matter described herein includes a method for performance optimization of storage allocation to virtual logical units. The method includes receiving, at a storage entity having data storage space for storing data, the data storage space being divided into a plurality of slices, an I/O write request to store data into the storage entity, and, in response to receiving the I/O write request, performing an allocation process. The allocation process includes: accessing in-memory statistics regarding the allocation of slices to logical units, the in-memory statistics being stored in a memory that is different from the data storage space; selecting, from the plurality of slices and based on the in-memory statistics, a slice to be allocated; allocating the selected slice; updating the in-memory statistics to reflect the allocation of the selected slice; processing the I/O write request; scheduling a post-I/O management process for the selected slice to be performed asynchronously from allocation processes; and updating a slice allocation table for storing slice allocation status to indicate that the post-I/O management process for the selected slice is pending. In one embodiment, the method also includes detecting a fault condition, and, in response to detecting the fault condition, accessing the slice allocation table to identify slices whose status indicates that the post-I/O management process for that slice is pending; and, for each slice so identified, scheduling a post-I/O management operation.

The subject matter described herein for performance optimization of storage allocation to virtual logical units may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which:

FIG. 5 is a block diagram illustrating an exemplary slice allocation table according to an embodiment of the subject matter described herein; and FIG. 6 is a block diagram illustrating exemplary information contained within in-memory statistics and/or management database according to an embodiment of the subject matter described herein.

DETAILED DESCRIPTION

In accordance with the subject matter disclosed herein, systems, methods, and computer readable media are provided for performance optimization of storage allocation to virtual logical units. Reference will now be made in detail to exemplary embodiments of the present invention, examples of which are illustrated in the accompanying drawings. Wherever possible, the same reference numbers will be used throughout the drawings to refer to the same or like parts.

When a storage entity receives a request to write data to a logical unit to which storage space is allocated only as needed, the storage entity may determine that storage space (or additional storage space) must be allocated to that logical unit. In this situation, the storage entity must select a portion of storage space to allocate, perform the allocation, and then write the data into the newly allocated storage space. The allocation step, e.g., associating the selected portion of storage space, herein referred to as a "slice", to the logical unit, usually involves bookkeeping operations, such as updating tables or other data structures that record the association of a particular slice to a particular logical unit. These bookkeeping operations are generically referred to as "management operations", and are distinct from the operations involving the storing of the data into the allocated space, which are generically referred to as "I/O operations".

The methods and systems according to the subject matter described herein further divide the management operations into two types—management operations that must be performed before the I/O operation, and management operations that may be performed after the I/O operation—and provide structures and data constructs that enable the post-I/O management operations to be decoupled from the I/O operation such that the post-I/O management operations may occur asynchronously with the I/O operation. The post-I/O management operations may even be deferred until after the performance of the pre-I/O management and I/O operations of subsequent I/O writes. A system that incorporates these structures and data constructs will now be described.

Figure 1:
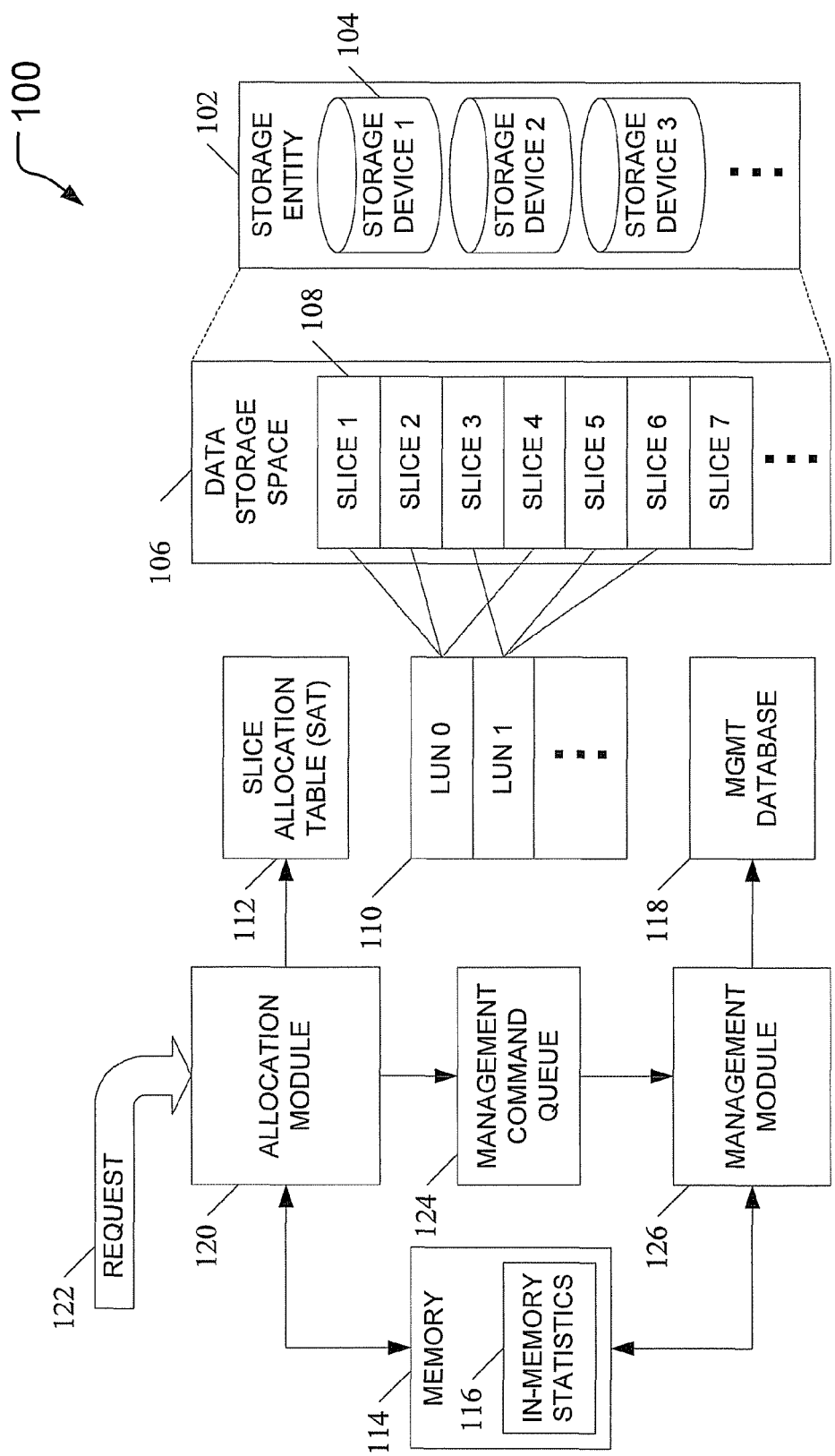
FIG. 1 is a block diagram illustrating an exemplary system for performance optimization of storage allocation to virtual logical units according to an embodiment of the subject matter described herein.

FIG. 1 is a block diagram illustrating an exemplary system for performance optimization of storage allocation to virtual logical units according to an embodiment of the subject matter described herein. System 100 includes a storage entity 102 having data storage space for storing data. Storage entity 102 may include one or more storage devices 104, which may be hard disk drives, flash drives, or other devices capable of storing data. In one embodiment, a collection of hard disk drives may be organized into redundant array of inexpensive disks (RAID) arrays. The collective data storage capacity of storage devices 104 is represented by data storage space 106.

Data storage space 106 may divided into portions, hereinafter referred to as slices 108. In the embodiment illustrated in FIG. 1, for example, each slice 108 is approximately 1 gigabyte (GB) in size, but other sizes may be used. Slices 108 within data storage space 106 may be organized into logical units (LUs), which are commonly referred to as LUNs 110. In the embodiment illustrated in FIG. 1, data storage space 106 includes two LUNs, LUN0 and LUN1. One or more slices 108 are allocated to each LUN 110. In the embodiment illustrated in FIG. 1, slices 1, 2, and 4 have been allocated to LUN0; slices 3, 5, and 6 have been allocated to LUN1; and slice 7 is unallocated to any LUN.

A slice allocation table (SAT) 112 maintains allocation information, including slice allocation status, for each slice 108. To reduce the time taken to update an entry within slice allocation table 112 and to guarantee that this update process is atomic, each entry within slice allocation table 112 is of a size such that the entry can be updated with a single I/O write. For example, each entry of slice allocation table 112 may be the size of a single disk sector of storage devices 104, or whatever size can be written in a single I/O write to storage entity 102.

A memory 114 that is separate from data storage space 106 is used for storing in-memory statistics 116 regarding the allocation of slices 108 to LUNs 110. In one embodiment, memory 114 may be all or a portion of random access memory (RAM) located within system 100, such as memory associated with a processor or controller within system 100.

A management database 118 that is different from memory 114 and slice allocation table 112 is used for storing information regarding the allocation of slices 108 to LUNs 110. The information stored in memory 114 may be the same or substantially the same as the information stored in management database 118.

In one embodiment, memory 114 is used as the work area or primary repository for storing information that the system needs during execution, while management database 118 functions as a non-volatile archive that is continually but asynchronously updated to reflect changes made to the statistics stored in memory 114. Alternatively, management database 118 may be considered to be the master copy for all information, while memory 114 may be used as a working copy of the information, which is quickly accessed and into which changes are first recorded before being committed to the master copy stored in management database 118.

In one embodiment, management database 118 is a non-volatile memory store, such as a database, a table, or a portion of one or more storage devices 104. Management database 118 has the advantage of being non-volatile but suffers the disadvantage that non-volatile memory storage is usually slow compared to memory 114, which has a fast access time compared to a database access to management database 118, but suffers the disadvantage that memory 114 is volatile, meaning that the in-memory statistics 116 are lost or go to an invalid or unreliable state in the event of a power loss, for example. As will be described below, however, slice allocation table 112, memory 114 and management database 118 are used together in a manner such that the strengths of each compensates for the weaknesses of the others.

In one embodiment, system 100 includes an allocation module 120 for performing an allocation process in response to receiving an I/O write request 122 or other request to write data to a LUN, where it is determined that a slice 108 must be allocated from data storage space 106. In one embodiment, upon receiving request 122, allocation module 120 uses in-memory statistics 116 to select a slice 108, which allocation module 120 then allocates to a LUN.

In one embodiment, allocation module 120 then performs the following steps: update in-memory statistics 116 to reflect the allocation of the selected slice; update slice allocation table 112 to reflect the allocation of the slice and to indicate that the post-I/O management process for the selected slice is pending; process the I/O write request 122; and schedule a post-I/O management process for the selected slice.

In one embodiment, updating in-memory statistics 116 to reflect the allocation of the selected slice may include writing to random access memory (RAM) that is within, coupled with, or accessible by allocation module 120. For example, in-memory statistics 116 may be stored in a table, data structure, or location in memory.

In one embodiment, processing I/O write request 122 may include performing the write, e.g., writing the data to data storage space 106. For example, allocation module 120 may write the data to the allocated slice 108. Alternatively, processing I/O write request 122 may include queuing the I/O write request for subsequent writing to data storage space 106.

In one embodiment, updating slice allocation table 112 reflects the allocation of the slice and indicates that the post-I/O management process for the selected slice is pending may include changing the slice allocation table 112 entry for the selected slice to indicate a change of status from "UNALLOCATED" to "ALLOCATED-UNCOMMITTED".

In one embodiment, scheduling a post-I/O management process for the selected slice may include submitting a command or commands to a queue, such as management command queue 124, that stores commands for later execution. For example, management command queue 124 may be a first-in, first-out (FIFO) buffer, which accepts input from allocation module 120. In an alternative embodiment, scheduling a post-I/O management process for the selected slice may include setting a flag, such as a bit in a bitmap, that is associated with a particular slice to indicate to that a post-I/O management process should be performed for that slice.

The actions performed during a post-I/O management process may include synchronizing management database 118 with in-memory statistics 116. For example, as described above, in-memory statistics 116 may be used to contain the most up-to-date information; in this case, management database 118 must be updated to match the information contained within in-memory statistics 116.

In one embodiment, system 100 includes a management module 126 for performing the scheduled post-I/O management processes asynchronously with the allocation process described above. In the embodiment illustrated in FIG. 1, management module 126 may receive or retrieve management commands from management command queue 124, which management module 126 then executes.

In one embodiment, the post-I/O management process may include updating management database 118 to reflect the allocation of the selected slice and updating the status of the selected slice in slice allocation table 112 to indicate that the post-I/O management process for the selected slice has been performed. In one embodiment, updating slice allocation table 112 indicates that the post-I/O management process for the selected slice has been performed may include changing the slice allocation table 112 entry for the selected slice to indicate a change of status from "ALLOCATED-UNCOMMITTED" to "ALLOCATED-COMMITTED".

Thus, to solve the disadvantages of conventional storage systems, the subject matter described herein makes the following optimizations: first, to speed up the I/O operations, slice allocation tables are maintained outside of the regular management database (e.g., stored in memory), allowing them to be quickly accessed on the I/O path. Also, slice allocation table entries are limited in size to the size of one disk sector, so that a SAT entry can be updated using sector-atomic writes, which are fast and complete in one I/O operation. Second, to increase throughput and minimize I/O latency and/or response times, some of the management operations are decoupled from the I/O operations, so that the processing of the next write can start independently of the management phase of the previous write. The in-memory slice allocation tables are updated immediately and quickly, and the management process, which ensures that the information stored in the in-memory SATs is properly stored into the management database (or other permanent storage), can execute asynchronously in the background.

Figure 2:
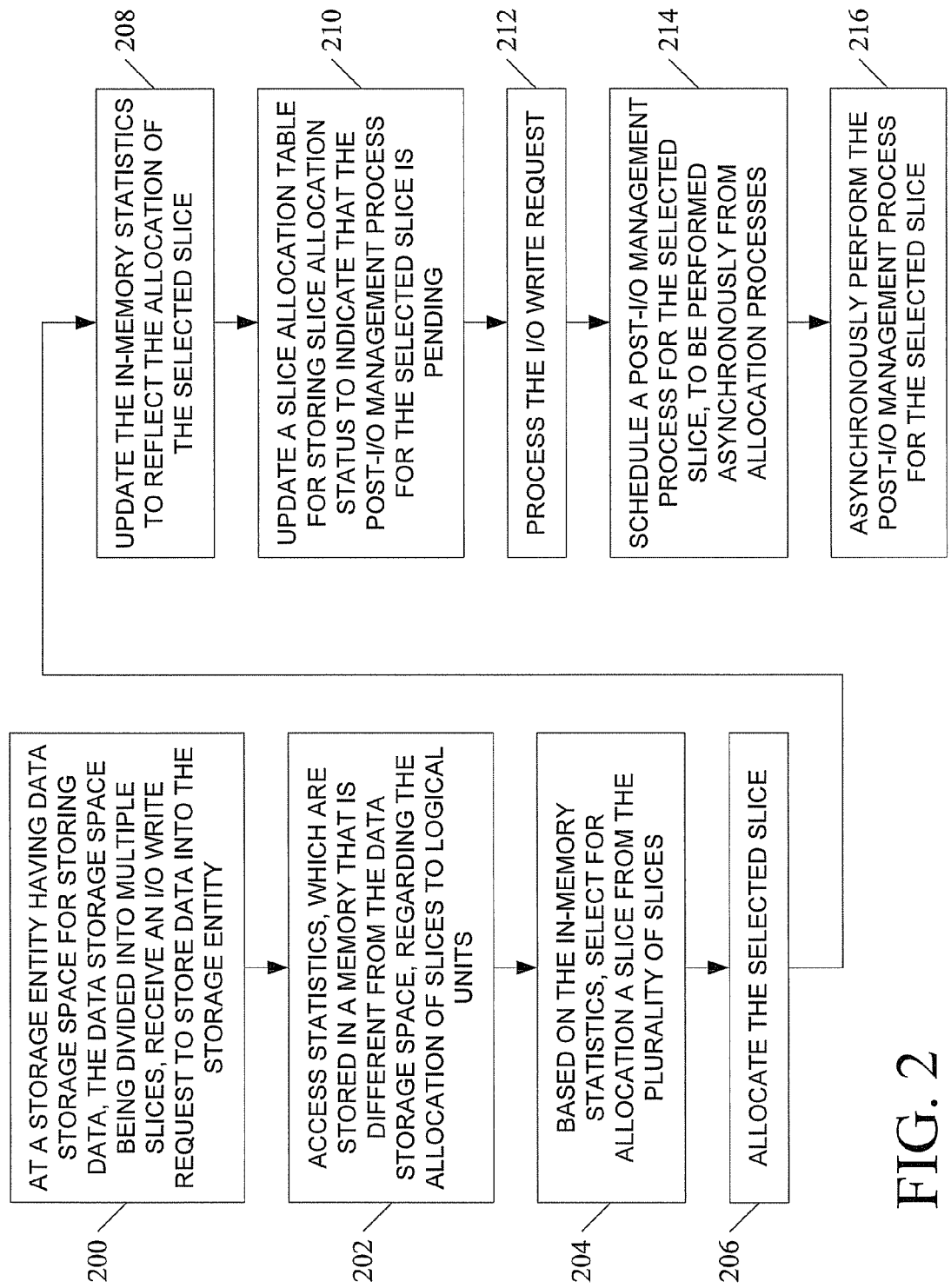
FIG. 2 is a flow chart illustrating an exemplary process for performance optimization of storage allocation to virtual logical units according to an embodiment of the subject matter described herein.

FIG. 2 is a flow chart illustrating an exemplary process for performance optimization of storage allocation to virtual logical units according to an embodiment of the subject matter described herein. This process will now be described with reference to FIGS. 1 and 2.

At block 200, a storage entity having data storage space for storing data, the data storage space being divided into multiple slices, receives an I/O write request to store data into the storage entity. For example, allocation module 120 may receive an I/O write request 122 for writing data into data storage space 106. In response to receiving the I/O write request, an allocation process is performed, starting with block 202.

At block 202, statistics regarding the allocation of slices to logical units and which are stored in a memory that is different from the data storage space are accessed. For example, allocation module 120 may access in-memory statistics 116 to collect information about how many slices 108 have been allocated from each storage device 104 and to which LUNs 110 the slices were allocated, etc.

At block 204, one of the slices is selected for allocation, based on the in-memory statistics. For example, allocation module 120 may select one slice from the collection of slices 108 based on in-memory statistics 116.

At block 206, the selected slice is allocated. For example, allocation module 120 may allocate the selected slice 108 to one of the LUNs 110.

At block 208, the in-memory statistics are updated to reflect the allocation of the selected slice. This is done so that so that subsequent slice-requests can be processed correctly, i.e., using the most recent and up-to-date information. In the embodiment illustrated in FIG. 1, allocation module 120 may update in-memory statistics 116. In-memory statistics 116 may include counts which show how many slices 108 have been allocated from each storage device 104 and/or to each LUN 110, for example.

At block 210, a slice allocation table for storing slice allocation status is updated to indicate that the post-I/O management process for the selected slice is pending. For example, allocation module 120 may update slice allocation table 112 to indicate that the status of selected slice has changed from "UNALLOCATED" to "ALLOCATED-UNCOMMITTED".

At block 212, the I/O write request is processed. For example, allocation module 120 may perform the I/O write, e.g., write the data into the newly allocated slice 108. Alternatively, allocation module 120 may forward the write request to another entity within system 100 responsible for performing the I/O write, or put request 122 into a queue for later processing by allocation module 120 or another entity within system 100.

At block 214, a post-I/O management process, to be performed asynchronously from allocation processes, is scheduled for the selected slice. For example, allocation module 120 may place one or more management commands into management command queue 124 for later execution by management module 124.

At block 216, the post-I/O management process for the selected slice is performed asynchronously from allocation processes. In the embodiment illustrated in FIG. 1, once the post-I/O management process has been scheduled by allocation module 120, e.g., by writing commands to management command queue 124, allocation module 120 may begin to process subsequent I/O write requests, and does not need to wait for management module 126 to finish (or even start) the post-I/O management process for the previous I/O write request.

Figure 3:
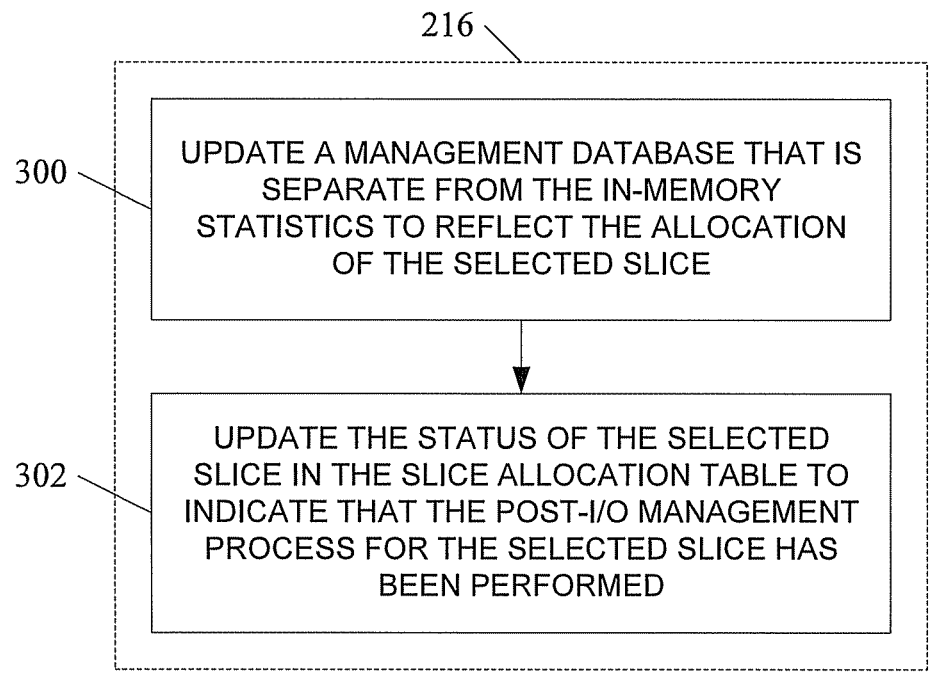
FIG. 3 is a flow chart illustrating an exemplary post-I/O management process according to an embodiment of the subject matter described herein.

FIG. 3 is a flow chart illustrating an exemplary post-I/O management process according to an embodiment of the subject matter described herein.

At block 300, a management database that is separate from the in-memory statistics is updated to reflect the allocation of the selected slice. For example, management module 124 may update management database 118 to reflect the allocation of selected slice 108. In one embodiment, the result of the post-I/O management process is that management database 118 will be synchronized with in-memory statistics 116.

At block 302, the status of the selected slice is updated in the slice allocation table to indicate that the post-I/O management process has been performed for the selected slice. In the embodiment illustrated in FIG. 1, for example, management module 124 may update slice allocation table 112 to indicate that the status of selected slice has changed from "ALLOCATED-UNCOMMITTED" to "ALLOCATED-COMMITTED"

By de-coupling the post-I/O management process from the allocation process, systems that operate according to the process described above may begin processing subsequent I/O write requests without having to wait for the completion of the post-I/O management process for the current I/O write, which improves system throughput.

Figure 4:
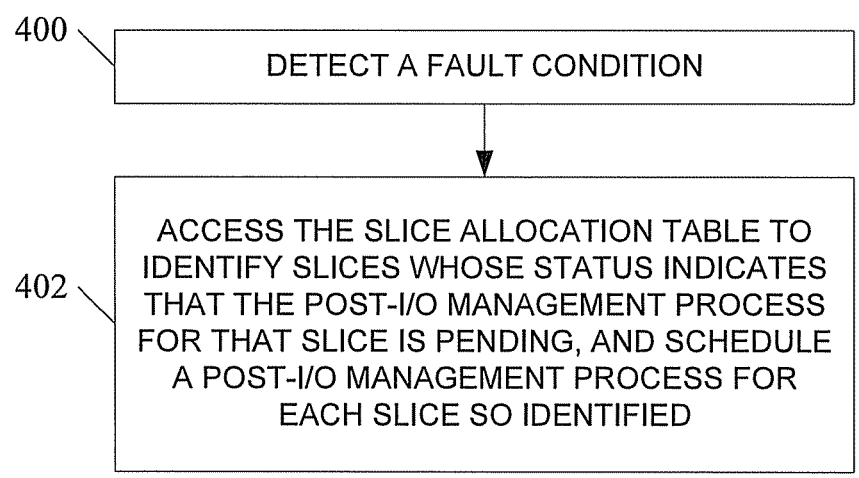
FIG. 4 is a flow chart illustrating a fault-recovery process performed by an exemplary system for performance optimization of storage allocation to virtual logical units according to an embodiment of the subject matter described herein.

In addition, a system according to the subject matter described herein is tolerant of faults or error conditions in which the in-memory statistics are erased, corrupted, or otherwise become unreliable, e.g., due to a power failure. As described above, memory 114 may have a short access time but is volatile, and management database 118 is non-volatile but has a long access time. Slice allocation table 112 is non-volatile, e.g., it is stored on a hard disk drive instead of RAM, but also has a short access time, since each entry in slice allocation table 112 is atomic, i.e., can be written in one disk I/O operation. FIG. 4, below, illustrates how these features are used together to provide a fault-tolerant data storage system.

FIG. 4 is a flow chart illustrating a fault-recovery process performed by an exemplary system for performance optimization of storage allocation to virtual logical units according to an embodiment of the subject matter described herein.

At block 400, the process begins with detection of a fault condition. One example of a fault condition is a power failure or glitch, which may be detected by some component within system 100. Another example of a fault condition is the determination that the in-memory statistics are unreliable. In one embodiment, each entry within in-memory statistics 116 may include some form of error correction code, parity bits, cyclic redundancy check data, etc., which allocation module 120 or management module 124 may use to verify the integrity of the data.

At block 402, in response to detection of the fault condition, the slice allocation table may be used to identify slices whose status indicates that a post-I/O management process for that slice is pending, and post-I/O management processes may be scheduled for each slice so identified. In one embodiment, allocation module 120 may search slice allocation table 112 for slices 108 whose status is "ALLOCATED-UNCOMMITTED" and schedule a post-I/O management process for those slices.

FIG. 5 is a block diagram illustrating an exemplary slice allocation table 112 according to an embodiment of the subject matter described herein. In the example slice allocation table 112 illustrated in FIG. 5, each row of the table represents an entry, and each entry stores allocation status information for one slice. Referring to FIG. 5, slices 1, 2, and 4 have been allocated to LUN0, but only slices 1 and 2 have been committed; slice 4 has the status of "ALLOCATED-UNCOMMITTED", indicating that the post-I/O management process for slice 4 is still pending. Similarly, slices 3, 5, and 6 have been allocated to LUN1, but only slices 3 and 5 have been committed; the post-I/O management process for slice 6 is still pending. Slice 7 has not been allocated to any LUN, as evident by its status, which is listed as "UNALLOCATED."

FIG. 6 is a block diagram illustrating exemplary information contained within in-memory statistics 116 and/or management database 118 according to an embodiment of the subject matter described herein. The information illustrated in FIG. 6 includes information regarding the allocation of slices 108 to LUNs 110. Each row of the table shown in FIG. 6 represents an entry, and each entry stores information for a particular storage device 104, such as how many slices 108 the particular storage device contains and how many of those slices have been already allocated.

In the example illustrated in FIG. 6, storage device number 1 contains 64 slices, of which 40 have been allocated to various LUNs. During the slice selection process described in block 206, above, allocation module 120 may determine that storage device number 2 has the most available free space compared to the other storage devices, and decide to allocate a slice from storage device 2.

The example information shown in FIG. 6 is for illustrative purposes only and is not intended to be limiting. Other types of information may be maintained by in-memory statistics 116 and/or management database 118, and some or all of the information may be used according to various algorithms or policies as part of the slice selection process.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for performance optimization of storage allocation to virtual logical units, the system comprising:
   a storage entity having data storage space for storing data, the data storage space being divided into a plurality of slices;
   a slice allocation table for storing slice allocation status;
   a memory, different from the data storage space and the slice allocation table, for storing in-memory statistics regarding the allocation of slices to logical units;
   a management database, different from the memory and the slice allocation table, for non-volatilely storing information regarding the allocation of slices to logical units;
   an allocation module for performing an allocation process in response to receiving an I/O write request, wherein the allocation process includes: selecting from the plurality of slices a slice to be allocated based on in-memory statistics, allocating the selected slice to a logical unit, updating the in-memory statistics to reflect the allocation of the selected slice, updating the slice allocation table to indicate that a post-I/O management process for the selected slice is pending, processing the I/O write request, and scheduling the post-I/O management process to be performed asynchronously; and
   a management module for performing scheduled post-I/O management processes asynchronously with allocation processes, wherein the post-I/O management process for the selected slice includes: updating the management database to reflect the allocation of the selected slice, and updating the status of the selected slice in the slice allocation table to indicate that the post-I/O management process for the selected slice has been performed.

2. The system of claim 1 comprising a management queue for storing commands associated with the scheduled post-I/O management process, wherein the allocation module is configured to schedule the post-I/O management process by writing commands to the management queue and wherein the management module is configured to perform the scheduled post-I/O management process by receiving the commands from the management queue and executing the received commands.

3. The system of claim 1 wherein the memory for storing statistics comprises a random access memory (RAM).

4. The system of claim 1 wherein, in response to an event that causes the in-memory statistics to be unreliable, the allocation module is configured to access the slice allocation table to identify slices whose status indicates that the post-I/O management operation for that slice is pending and to schedule a post-I/O management operation for each slice so identified.

5. A method for performance optimization of storage allocation to virtual logical units, the method comprising:
   at a storage entity having data storage space for storing data, the data storage space being divided into a plurality of slices:
   receiving an I/O write request to store data into the storage entity, and, in response to receiving the I/O write request, performing an allocation process, the allocation process comprising:
   accessing in-memory statistics regarding the allocation of slices to logical units, the in-memory statistics being stored in a memory that is different from the data storage space and different from a slice allocation table for non-volatilely storing slice allocation status;
   selecting, from the plurality of slices and based on the in-memory statistics, a slice to be allocated;
   allocating the selected slice to a logical unit;
   updating the in-memory statistics to reflect the allocation of the selected slice;
   updating the slice allocation table to indicate that the post-I/O management process for the selected slice is pending;
   processing the I/O write request; and
   scheduling a post-I/O management process for the selected slice to be performed asynchronously from allocation processes.

6. The method of claim 5 comprising performing the scheduled post-I/O management process asynchronously from allocation processes, wherein the post-I/O management process includes:
   updating a management database, separate from the in-memory statistics, to reflect the allocation of the selected slice; and updating the status of the selected slice in the slice allocation table to indicate that the post-I/O management process for the selected slice has been performed.

7. The method of claim 6 wherein scheduling a post-I/O management process for the selected slice comprises submitting management commands to management command queue and wherein performing the scheduled post-I/O management process comprises executing management commands that are retrieved from the management command queue.

8. The method of claim 5 comprising:

detecting a fault condition; and in response to detecting the fault condition, accessing the slice allocation table to identify slices whose status indicates that the post-I/O management process for that slice is pending; and, for each slice so identified, scheduling a post-I/O management operation.

9. The method of claim 8 wherein detecting a fault condition comprises at least one of a detection of a power failure and a determination that the in-memory statistics are unreliable.

10. A computer readable memory having stored thereon executable instructions that when executed by the processor of a computer control the computer to perform steps comprising:

receiving an I/O write request to store data into the storage entity having data storage space for storing data, the data storage space being divided into a plurality of slices, and, in response to receiving the I/O write request, performing an allocation process, the allocation process comprising:

accessing in-memory statistics regarding the allocation of slices to logical units, the in-memory statistics being stored in a memory that is different from the data storage space and different from a slice allocation table for non-volatilely storing slice allocation status;

selecting, from the plurality of slices and based on the in-memory statistics, a slice to be allocated;

allocating the selected slice to a logical unit;

updating the in-memory statistics to reflect the allocation of the selected slice;

updating the slice allocation table to indicate that the post-I/O management process for the selected slice is pending; processing the I/O write request; and scheduling a post-I/O management process for the selected slice to be performed asynchronously from allocation processes.

* * * * *